L. G. MULLEN.
TRANSPARENT PAVEMENT.
APPLICATION FILED JUNE 16, 1913.

1,081,979.

Patented Dec. 23, 1913.

WITNESSES
F. B. Worden.
E. Walton Brewington.

INVENTOR
Leo G. Mullen,
By Henry J. Brewington, Attorney

UNITED STATES PATENT OFFICE.

LEO G. MULLEN, OF CRAFTON, PENNSYLVANIA.

TRANSPARENT PAVEMENT.

1,081,979.  Specification of Letters Patent.  Patented Dec. 23, 1913.

Application filed June 16, 1913. Serial No. 773,849.

*To all whom it may concern:*

Be it known that I, LEO G. MULLEN, a citizen of the United States, residing at Crafton, in the county of Allegheny and State of Pennsylvania, have invented certain new and useful Improvements in Transparent Pavements, of which the following is a specification.

This invention relates to an improvement in transparent pavements, vault covers, and the like, and has for its object the provision of a pavement or vault cover of such construction that the lens may be easily and quickly installed or removed to meet the requirements of repair and for purposes of ventilation, the further object being to provide a helix or reinforcement into which the lenses are secured which consists of a spiral or helically formed wire which is anchored in plastic material such as cement, concrete, and the like before it becomes hardened; the wire so formed serving as a thread to engage the thread on the lens whereby the lenses are removably secured in the pavement or vault cover as the case may be, and which may be easily and quickly removed to meet the desired purpose.

With the above and other objects in view as will presently appear as the construction and operation of the invention is better understood, it is to be understood that slight changes and alterations may be resorted to in the form and arrangement of the several parts hereinafter described within the scope of the appended claims without departing from the spirit and scope of the invention or sacrificing any of its advantages.

Figure 1:
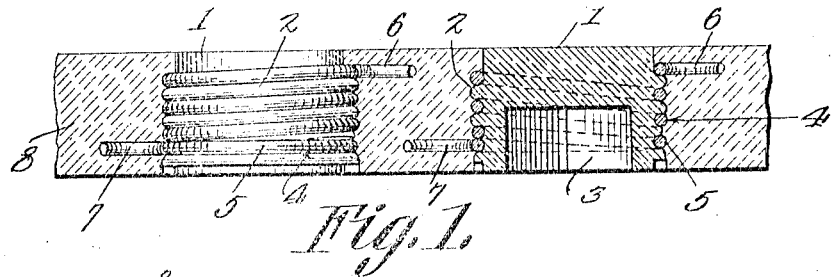
Figure 2:
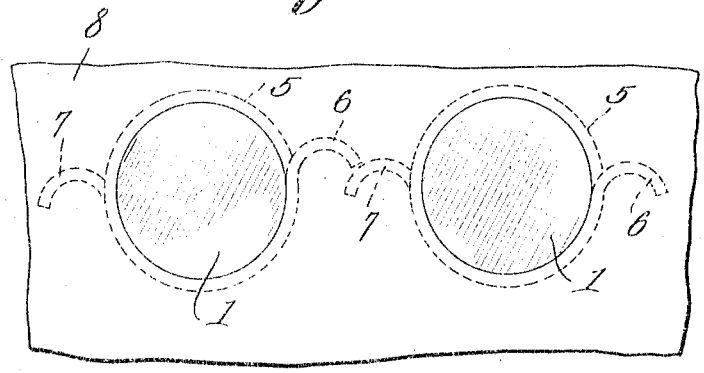
Figure 3:
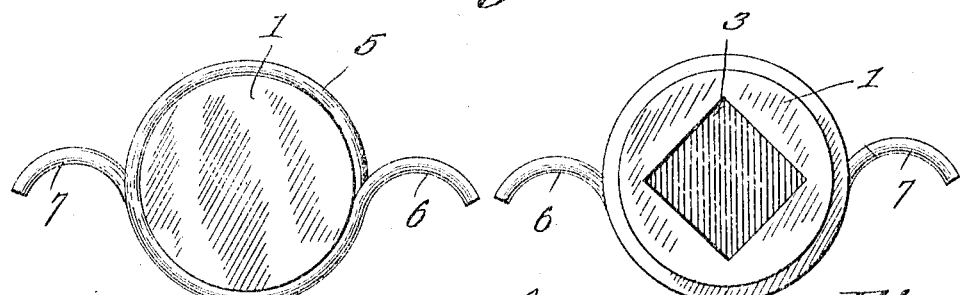
Figure 4:
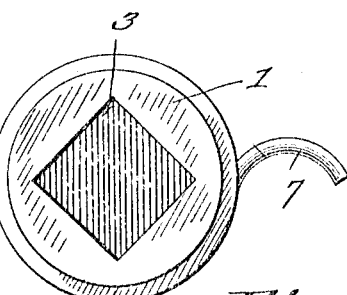

In the accompanying drawings forming a part of this specification, in which is illustrated a specific embodiment of my invention, and in which like characters of reference indicate like parts throughout the several views: Figure 1 is a view in section of a sidewalk or vault cover with one of the lenses in elevation, and another in section; Fig. 2 is a plan view of the same; Fig. 3 is a plan view of a lens in the helix or reinforcement removed from the pavement; Fig. 4 is a similar view showing the under side of the lens, and Fig. 5 is a plan view partly in section of a modified form of lens and helix.

In the drawings the cylindrical glass body part 1, is spirally or helically threaded at 2, and is provided with a squared or other suitable shaped cavity or depression 3, for the purpose of receiving a suitable tool for screwing and unscrewing the lens in and from the helix when the helix is secured in the plastic material forming the pavement.

4 indicates a wire wound to form a spiral or helix 5, adapted to serve as a screw thread to engage the threads 2 on the lens. The helically formed wire has its ends terminating in laterally extended arms 6 and 7 respectively, by which the helix is anchored in the material forming the pavement 8, while the material is in a plastic condition, and when the material hardens the arms of the helix become securely anchored therein.

Figure 5:
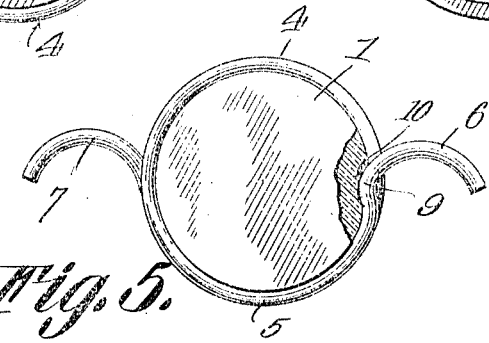

In Fig. 5 is shown a modified form, the object of which being to lock the lens within the helix to prevent the lens from being jarred loose or from the helix, and is especially desirable for use in places subject to more or less vibration. The wire 4 adjacent to the arm 8 is bent to form a shoulder 9, adapted to engage or project into the depression 10, provided in the lens 1, at its upper circumferential edge, so that when the lens is screwed within the helix the lens becomes locked therein against jar and vibration.

Having fully described the invention, what I claim and desire to secure by Letters Patent, is:

1. A device of the character described, comprising a helically threaded lens, a fixed wire helix adapted to receive said lens, and coöperating means upon said lens and wire helix for locking them together, said locking means being automatically operated by screwing the lens into the wire helix.

2. A device of the character described, comprising a helically threaded lens having a depression in its periphery, and a fixed wire helix having a portion bent to form an inwardly projecting shoulder, said shoulder adapted to engage said depression in the threaded lens for locking the parts together when the lens is screwed into the wire helix.

In testimony whereof I affix my signature in presence of two witnesses.

LEO G. MULLEN.

Witnesses:
E. WALTON BREWINGTON,
HOWARD D. ADAMS.